United States Patent [19]

Kellett et al.

[11] Patent Number: 4,727,224

[45] Date of Patent: Feb. 23, 1988

[54] TRANSMISSION LINE CLAMP

[76] Inventors: K. Craige Kellett, R. R. #1, Minden, Ontario, Canada; E. Glenn Kellett, Box 914, Hamilton 5, Bermuda

[21] Appl. No.: 31,548

[22] Filed: Mar. 30, 1987

[51] Int. Cl.⁴ .................. H01B 17/38; H01B 17/16; F16G 11/00; H01R 4/42

[52] U.S. Cl. .................. 174/169; 24/135 R; 248/74.4

[58] Field of Search .................. 174/40 R, 146, 168, 174/169, 176; 24/135 R, 135 K, 135 L, 135 N; 248/63, 65, 74.1, 74.4, 231.4, 231.6, 231.7, 316.4, 316.6; 439/801, 803

[56] References Cited

U.S. PATENT DOCUMENTS

| | | | |
|---|---|---|---|
| 2,584,743 | 2/1952 | Schoonmaker et al. | 24/135 R |
| 3,132,914 | 5/1964 | Wengen | 439/803 X |
| 3,437,742 | 4/1969 | Lindsey | 174/169 |
| 3,437,743 | 4/1969 | Lindsey | 174/169 |
| 3,547,386 | 12/1970 | Burgess et al. | 248/63 |
| 3,623,687 | 11/1971 | Nordstrom | 174/169 X |
| 4,178,470 | 12/1979 | Jean et al. | 174/168 |

*Primary Examiner*—Laramie E. Askin
*Attorney, Agent, or Firm*—Ridout & Maybee

[57] ABSTRACT

A clamp for a transmission wire has a clamping arm which travels on a captive bolt assembly and which may be pivoted away from a clamp saddle without disengaging the bolt assembly. The clamp may be manipulated with one hand, requiring a wrench as the only tool to tighten or loosen the clamping arm. The clamp is especially suitable for use in live line applications, since the risk of electrical shock is minimized by virtue of its structure.

12 Claims, 3 Drawing Figures

TRANSMISSION LINE CLAMP

The present invention relates to a clamp for power transmission lines. The invention provides a structure which is inherently safer to use with live transmission lines than many of the clamps presently installed, because the clamp may be manipulated by the line worker using just one hand. This feature greatly reduces the risk of forming an electric circuit through the body of the line worker.

The invention provides a clamp for an electrical transmission line, comprising a body having a socket for attachment of an electrical insulator, a concavely curved saddle for receiving the transmission line, and an aperture defined transversely through the body, preferably adjacent the saddle. The aperture has an upper portion which is preferably square in cross section, but which has at least one flat internal surface and a lower portion which is circular in cross section, a transverse surface being defined at the junction of the two portions. A rod having upper and lower threaded portions separated by an annular flange is insertable through the aperture so that the lower portion may extend beyond the bottom of the aperture and the flange may engage the transverse surface. The rod has a nut which is affixed to the lower portion extending through the aperture preferably by means of a pin which passes through a hole defined transversely through the lower portion and nut. A clamping arm has a leg which is insertable in the upper portion of the aperture in the body. The leg has a longitudinal bore threaded to receive the upper portion of the rod. The leg has an upper portion which is preferably square in cross section, but having a cross sectional shape which matches that of the upper aperture portion. The leg has a lower portion which is rounded and preferably circular in cross section. The clamping arm has a transmission line keeper positionable over the saddle to clamp the transmission line in the saddle. The keeper extends from the upper portion of the leg and is oriented transversely to it. The clamping arm coacts with the rod to permit the leg to travel longitudinally in the aperture and to permit the keeper to be pivoted about the rod when the leg is near the end of its travel on the upper threaded portion. This pivotability of the arm is afforded by the rounded lower portion of the leg which may be rotated in the aperture.

Figure 1:
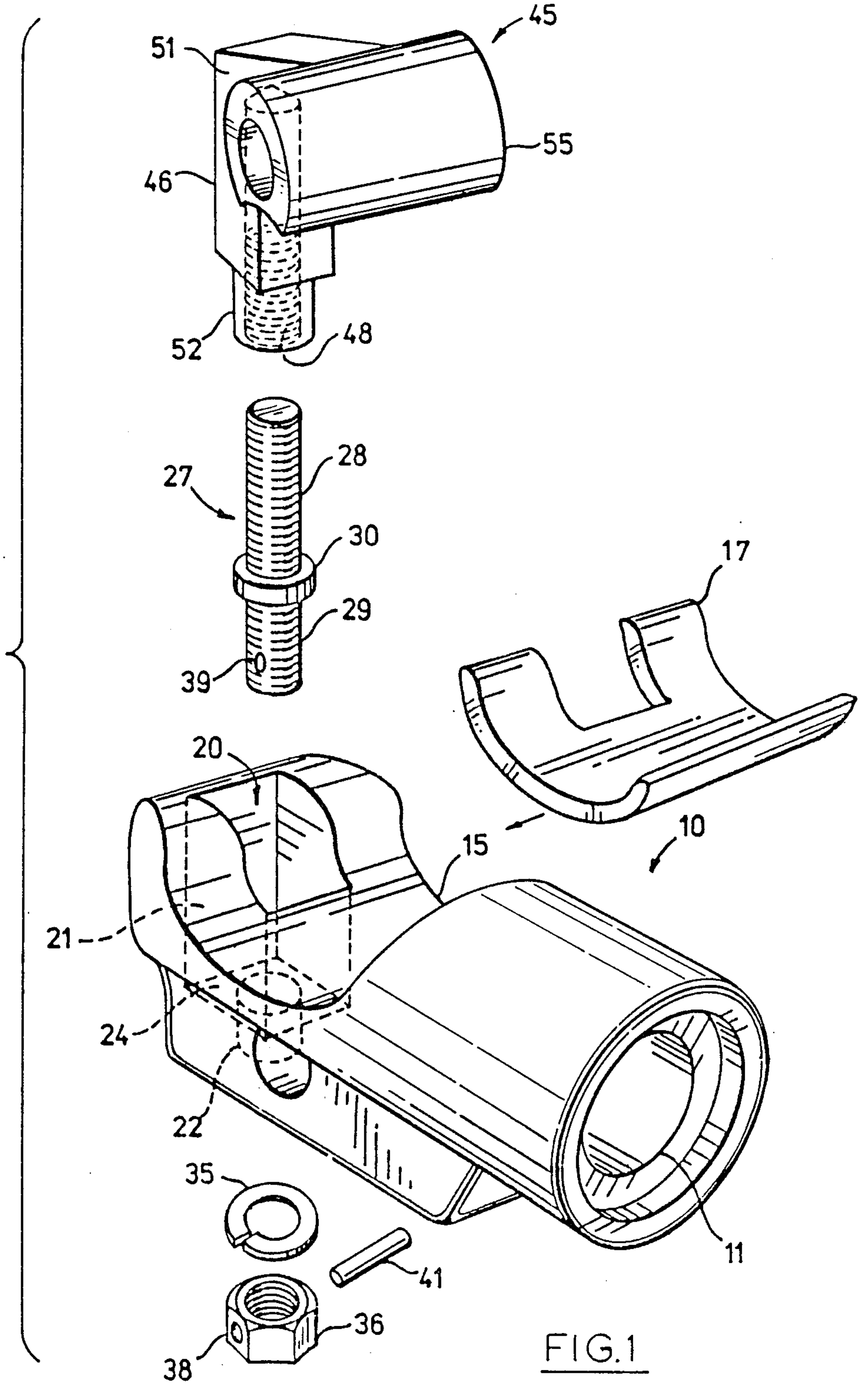
FIG. 1 is an exploded perspective view of a clamp in accordance with the invention.
Figure 2:
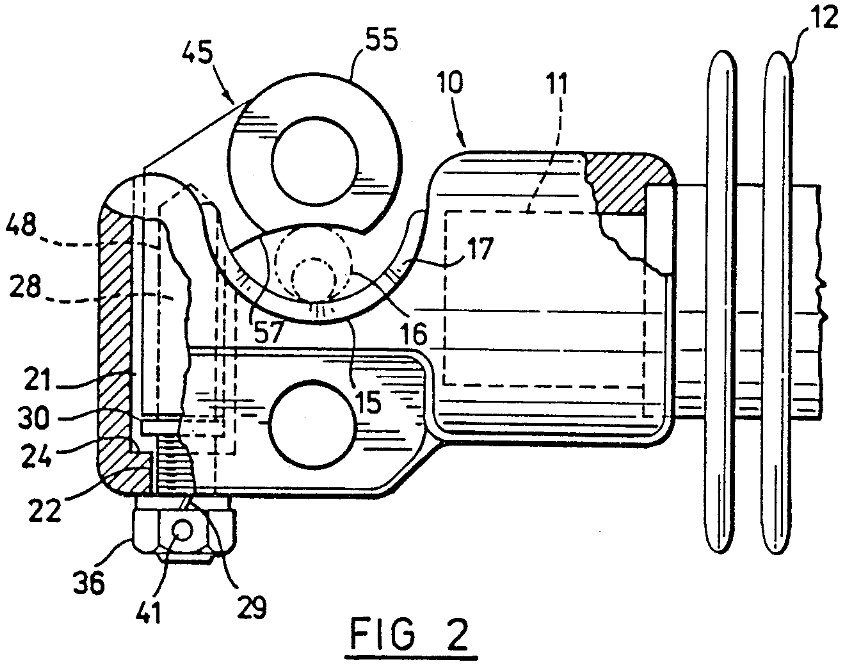
FIG. 2 is a side elevation, partially broken away, of the assembled clamp of FIG. 1.

The preferred embodiment of the clamp of the invention comprises a body 10 having a socket 11 formed therein for receiving an electrical insulator 12 (FIG. 2). The body 10 has a concavely curved saddle 15 for receiving a transmission line 16. The saddle 15 is preferably lined with a rubberized insulating material 17. If the body 10 is made of metal, the insulating lining 17 for the saddle 15 is usually required to minimize radio interference. A carbon impregnated rubber lining 17 has been found to be suitable in this regard.

An aperture 20 is defined transversely through the body 10 preferably adjacent the saddle 15 such as shown in the Figures at an upwardly curving side of the saddle 15. The aperture 20 has an upper portion 21 which is not circular and is preferably square in cross section, and a lower portion 22 which is circular in cross section. The junction of the upper and lower portions 21 and 22 defines a transverse surface 24 bounded by the walls of the upper portion 21 and having the top edge of the lower portion 22 located centrally therein.

A threaded rod 27 has an upper portion 28 and a lower portion 29 separated by an annular flange 30. The rod is insertable through the aperture 20 so that the lower portion 29 extends beyond the bottom of the aperture 20. The flange 30 is engagable with the surface 24 and prevents the rod 27 from passing completely through the aperture 20. Preferably a lock washer 35 is provided over the lower portion 29 of the rod 27 which extends beyond the bottom of the aperture 20, and a nut 36 is attached to the end of the rod 27. While the nut 36 may be attached to the rod 27 in a variety of ways, a preferred means of attachment is to pin the nut 36 in place. Thus, transverse holes 38 and 39 are provided through the nut 36 and rod 27 so that a pin 41 may be inserted therethrough. The attachment of the nut 36 to the lower end of the rod 27 renders the assembly a bolt which is captive about the lower aperture portion 22.

A clamping arm 45 has a leg 46 which is insertable in the upper portion 21 of the aperture 20. The leg 46 has a longitudinal bore 48 running centrally thereof from the bottom of the leg 46 to near, but preferably not through, the top of the leg 46. The bore 48 is threaded to accept the upper portion 28 of the rod 27. The leg 46 has an upper portion 51 having a cross sectional shape which is compatible with that of the upper portion 21 of the aperture 20, and having a lower portion 52 which is circular in cross section. The clamping arm 45 has a transmission line keeper 55 which is positionable over the saddle 15 to clamp the transmission line 16 in place (FIG. 2). The keeper 55 extends from the upper portion 51 of the leg 46 and is oriented transversely to it. Preferably, the keeper 55 has a concavely curved bottom surface 57 compatible with the rounded contour of the transmission line 16. The keeper 55 also preferably has a length matching the seat width of the saddle 15 so that the line 16 may be firmly clamped about the entire length which is seated therein.

Figure 3:
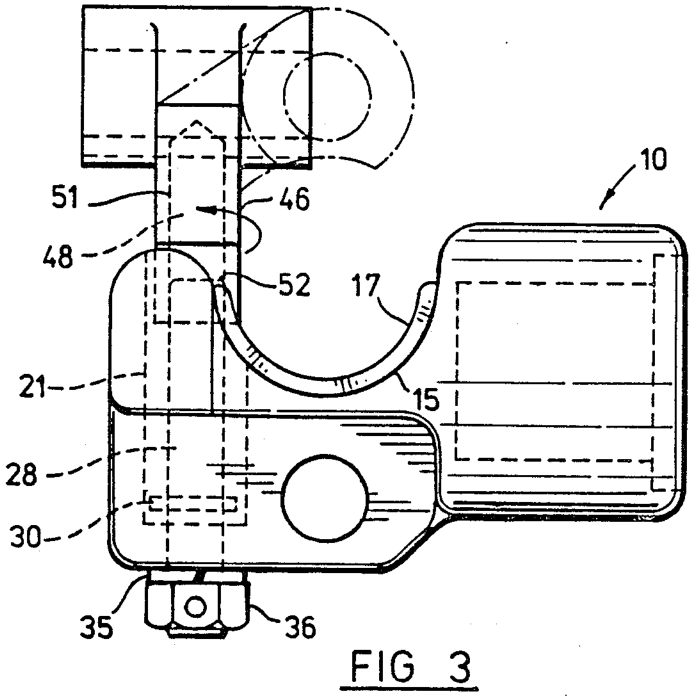
FIG. 3 is a side elevation of the clamp showing the keeper being pivoted about the bolt assembly.

The clamp is operated by rotating the rod 27 by means of the nut 36 affixed to it. Since the rod 27 and nut 36 assembly is captive about the lower aperture portion 22, rotation thereof causes the clamping arm 45 to move upwardly or downwardly along the length of the upper portion 28 of the rod 27. When inserting a transmission line 16 into the saddle 15, the clamping arm 45 is run up the rod 27 until the upper portion 51 of the leg 46 clears the top of the aperture 20 enabling the keeper 55 to be pivoted away from the saddle 15 about the lower circular portion 52 of the leg 46 (FIG. 3). With the line 16 in place in the saddle 15, the keeper 55 is then swung over the saddle 15 and the rod 27 is rotated by means of the affixed nut 36 to cause the leg 46 to move downwardly into the aperture 20. The upper portions 51 and 21 of the leg 46 and the aperture 20 coact to prevent rotation of the leg 46, and hence, the clamping arm 45 about the axis of the rod 27. While the simplest and preferred cross sectional shape for these upper portions 51 and 21 is square or rectangular, it should be apparent that the invention includes any shape which affords the desired function. As the arm 45 is screwed down the rod 27, the keeper 55 comes in contact with the line 16 and is tightened in place by the nut 36 preferably with the assistance of the lock washer 35.

From the foregoing description variations of the preferred embodiment will be apparent to the skilled person. These variations within the scope of the invention are defined in the claims which follow.

We claim:

1. A clamp for an electrical transmission line, comprising:

a body having a socket for attachment of an electrical insulator, a concavely curved saddle for receiving a transmission line, and an aperture defined transversely through the body, the aperture having an upper portion which is not circular in cross section and a lower portion which is circular in cross section, a transverse surface being defined at the junction of the two portions;

a rod having upper and lower threaded portions separated by an annular flange, said rod extending through the aperture so that the lower portion extends beyond the bottom of the aperture and the flange is adjacent the transverse surface;

a nut attached to the lower threaded portion of the rod extending through the aperture;

a clamping arm having a leg inserted in the upper portion of the aperture, the leg defining a longitudinal bore which is threaded and receives the upper portion of the rod, an upper portion of the leg having a cross sectional shape compatible with that of the upper portion of the aperture and a lower portion of the leg having a circular cross sectional shape; the clamping arm having a transmission line keeper positionable over the saddle to clamp a transmission line in the saddle, the keeper extending from the upper portion of the leg and being oriented transversely to it, the clamping arm coacting with the rod to permit the leg to travel longitudinally in the aperture, the shape of the upper portions of the aperture and the leg preventing rotation of the leg about the axis of the rod, the circular shape of the lower portion of the leg permitting the keeper to be pivoted about the rod when the leg is near the end of its travel thereon.

2. A clamp as claimed in claim 1, wherein the saddle is lined with an electrically insulating material.

3. A clamp as claimed in claim 2, wherein the insulating material is a rubber.

4. A clamp as claimed in claim 1, wherein the aperture is located adjacent the saddle.

5. A clamp as claimed in claim 4, wherein the aperture passes through the body at an upwardly curving side of the saddle.

6. A clamp as claimed in claim 1, wherein the upper portion of the aperture has at least one flat internal surface.

7. A clamp as claimed in claim 6, wherein the upper portion of the aperture is rectangular in cross section.

8. A clamp as claimed in claim 7, wherein the upper portion of the aperture is square in cross section.

9. A clamp as claimed in claim 1, wherein the nut is attached to the rod by means of a pin passing through both the rod and the nut.

10. A clamp as claimed in claim 1, further comprising a lock washer about the lower rod portion between the nut and the bottom of the aperture.

11. A clamp as claimed in claim 1, wherein the keeper has a concavely curved bottom surface.

12. A clamp as claimed in claim 1, wherein the keeper extends over substantially the entire width of the saddle.

* * * * *